US012570883B2

(12) United States Patent
Peng et al.

(10) Patent No.: US 12,570,883 B2
(45) Date of Patent: Mar. 10, 2026

(54) SEALANT COMPOSITION

(71) Applicant: DOW SILICONES CORPORATION, Midland, MI (US)

(72) Inventors: Jiang Peng, Shanghai (CN); Yi Guo, Shanghai (CN); Nanguo Liu, Midland, MI (US); Nick Shephard, Auburn, MI (US); Ye Wu, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 767 days.

(21) Appl. No.: 17/786,425

(22) PCT Filed: Dec. 17, 2019

(86) PCT No.: PCT/CN2019/125820
§ 371 (c)(1),
(2) Date: Jun. 16, 2022

(87) PCT Pub. No.: WO2021/119974
PCT Pub. Date: Jun. 24, 2021

(65) Prior Publication Data
US 2023/0035408 A1    Feb. 2, 2023

(51) Int. Cl.
*C09K 3/10* (2006.01)
*B01J 21/06* (2006.01)
*B01J 31/12* (2006.01)
*C08L 83/04* (2006.01)

(52) U.S. Cl.
CPC ........... *C09K 3/1018* (2013.01); *B01J 21/063* (2013.01); *B01J 21/066* (2013.01); *B01J 31/12* (2013.01); *C08L 83/04* (2013.01)

(58) Field of Classification Search
CPC ..... C09K 3/1018; B01J 21/063; B01J 21/066; B01J 31/12; C08L 83/04
See application file for complete search history.

(56) References Cited

U.S. PATENT DOCUMENTS

| | | |
|---|---|---|
| 3,105,061 A | 9/1963 | Bruner |
| 3,635,887 A | 1/1972 | Polmanteer |
| 3,996,184 A | 12/1976 | Klosowski |
| 4,515,932 A | 5/1985 | Chung |
| 4,680,364 A | 7/1987 | Lucas |
| 4,962,152 A | 10/1990 | Leempoel |
| 5,017,628 A | 5/1991 | Dietlein |
| 5,053,442 A | 10/1991 | Chu et al. |
| 5,300,608 A | 4/1994 | Chu et al. |

| | | | |
|---|---|---|---|
| 5,489,479 A | 2/1996 | Lucas et al. | |
| 5,519,104 A | 5/1996 | Lucas | |
| 5,674,936 A | 10/1997 | Lucas | |
| 6,162,756 A | 12/2000 | Friebe et al. | |
| 6,562,931 B1 | 5/2003 | Knepper | |
| 6,703,442 B1 | 3/2004 | Ando et al. | |
| 7,504,468 B2 | 3/2009 | Guennouni et al. | |
| 8,067,508 B2 | 11/2011 | Braun et al. | |
| 8,153,261 B2 * | 4/2012 | Landon .................. | C08G 18/10 428/424.7 |
| 11,168,213 B2 | 11/2021 | Huang et al. | |
| 2003/0216536 A1 | 11/2003 | Levandoski et al. | |
| 2005/0288415 A1 | 12/2005 | Beers et al. | |
| 2006/0074183 A1 | 4/2006 | Sakamoto et al. | |
| 2007/0088110 A1 * | 4/2007 | Kohl ..................... | C09J 201/10 524/492 |
| 2007/0237912 A1 | 10/2007 | Correia | |
| 2010/0099793 A1 | 4/2010 | Wunder | |
| 2010/0139843 A1 | 6/2010 | DeCato | |
| 2010/0234510 A1 | 9/2010 | Feder et al. | |
| 2010/0317796 A1 | 12/2010 | Huang et al. | |
| 2011/0198779 A1 | 8/2011 | Davio et al. | |
| 2013/0023602 A1 | 1/2013 | Dorman | |
| 2013/0338289 A1 | 12/2013 | Jadot et al. | |
| 2014/0235812 A1 | 8/2014 | Brandstadt et al. | |
| 2014/0288222 A1 | 9/2014 | Yano et al. | |
| 2014/0343202 A1 | 11/2014 | Dinkar et al. | |
| 2015/0031841 A1 | 1/2015 | Horstman et al. | |
| 2015/0045519 A1 | 2/2015 | Rutz et al. | |
| 2015/0159051 A1 | 6/2015 | Kohl et al. | |
| 2016/0340548 A1 | 11/2016 | Gubbels et al. | |
| 2017/0022325 A1 * | 1/2017 | Monteil .............. | C08K 5/0025 |
| 2017/0101564 A1 | 4/2017 | Choffat | |
| 2018/0258316 A1 | 9/2018 | Lucas | |

(Continued)

FOREIGN PATENT DOCUMENTS

| | | |
|---|---|---|
| EP | 38221 B1 | 11/1985 |
| EP | 802222 A1 | 10/1997 |
| EP | 802233 A2 | 10/1997 |

(Continued)

OTHER PUBLICATIONS

Machine assisted English translation of CN1597828A obtained from https://patents.google.com/patent on Jan. 12, 2023, 7 pages.

(Continued)

*Primary Examiner* — John M Cooney
*Assistant Examiner* — Adam J Berro
(74) *Attorney, Agent, or Firm* — Warner Norcross + Judd LLP

(57) ABSTRACT

Two-part condensation curable silyl-modified polymer (SMP) based sealant compositions, in particular two-part condensation curable SMP based translucent sealant compositions containing a catalyst comprising (i) a titanate and/or zirconate and (ii) a metal carboxylate salt.

17 Claims, No Drawings

(56)                References Cited

U.S. PATENT DOCUMENTS

2021/0206938 A1      7/2021  Ganachaud et al.

FOREIGN PATENT DOCUMENTS

| | | | | | |
|---|---|---|---|---|---|
| EP | 1043356 | A1 | 10/2000 | | |
| EP | 1238005 | B1 | 9/2004 | | |
| EP | 3489010 | A1 * | 5/2019 | ............. | B32B 25/06 |
| JP | 2000345043 | A | 12/2000 | | |
| JP | 2014043519 | A | 3/2014 | | |
| JP | 2015017277 | A | 1/2015 | | |
| WO | 2013130574 | A1 | 9/2013 | | |
| WO | 2019024430 | A1 | 2/2019 | | |
| WO | 2019190775 | A1 | 10/2019 | | |
| WO | 2019190776 | A1 | 10/2019 | | |
| WO | 2019200579 | A1 | 10/2019 | | |

OTHER PUBLICATIONS

Machine assisted English translation of CN102952270A obtained from https://patents.google.com/patent on Aug. 24, 2022, 9 pages.
Machine assisted English translation of CN103396757A obtained from https://patents.google.com/patent on Aug. 24, 2022, 9 pages.
Machine assisted English translation of CN103408941A obtained from https://patents.google.com/patent on Aug. 24, 2022, 8 pages.
Machine assisted English translation of CN104497579B obtained from https://patents.google.com/patent on Aug. 24, 2022, 11 pages.
Machine assisted English translation of CN1597824A obtained from https://patents.google.com/patent on Aug. 24, 2022, 8 pages.
Machine assisted English translation of CN1654584A obtained from https://patents.google.com/patent on Aug. 24, 2022, 9 pages.
Brook, M., "Silicon in Organic, Organometallic and Polymer Chemistry", John Wiley & Sons, Inc. (2000), pp. 284-287.
International Search Report for PCT/US2020/065475 dated Apr. 4, 2021, 3 pages.
International Search Report for PCT/CN2019/125816 dated Sep. 21, 2020, 3 pages.
International Search Report for PCT/CN2019/125817 dated Jul. 29, 2020, 3 pages.
International Search Report for PCT/CN2019/125815 dated Sep. 22, 2020, 3 pages.
International Search Report for PCT/CN2019/125814 dated Jul. 29, 2020, 3 pages.
International Search Report for PCT/CN2019/125820 dated Sep. 2, 2020, 4 pages.
Noll, W., Chemistry and Technology of Silicones, Academic Press Inc., New York, (1968) pp. 396-399.
Machine assisted English translation of FR1494500A obtained from https://worldwide.espacenet.com/patent on Jun. 21, 2023, 6 pages.
Knipe et al. "In Situ Kinetics of Moisture-Reactive Acetoxysiloxane Sealants" Ind. Eng. Chem. Res. 2019, 58, 17266-17276.

* cited by examiner

SEALANT COMPOSITION

CROSS-REFERENCE TO RELATED APPLICATIONS

This application is the U.S. National Stage of and claims priority to International Application No. PCT/CN2019/125820 filed on 17 Dec. 2019, the contents of which is incorporated herein by reference.

FIELD OF THE INVENTION

This disclosure is concerned with the provision of two-part condensation curable silyl-modified polymer (SMP) based sealant compositions, in particular two-part condensation curable SMP based translucent sealant compositions containing a catalyst comprising (i) a titanate and/or zirconate and (ii) a metal carboxylate salt.

BACKGROUND OF THE INVENTION

Room temperature vulcanizable (RTV) SMP based sealant compositions are well known. Generally, such compositions comprise polymers having either silanol (—Si—OH) containing silyl terminal groups attached to suitable organic polymer backbones or Si-alkoxy containing silyl terminal groups attached to suitable organic polymer backbones and one or more suitable cross-linking agents designed to react with the —OH and/or alkoxy groups and thereby cross-link the composition to form an elastomeric sealant product. One or more additional ingredients such as catalysts, reinforcing fillers, non-reinforcing fillers, diluents (e.g. plasticisers and/or extenders), chain extenders, flame retardants, solvent resistant additives, biocides and the like are often also incorporated into these compositions as and when required. The RTV SMP based sealant compositions may be one-part compositions or multiple-part compositions.

SMP sealant compositions having at least one Si-alkoxy bond, e.g. an Si-methoxy bond in the silyl modified terminal group and having a polyoxyalkylene polymer as the organic polymeric backbone are widely used in sealants and adhesives in the construction industry and in the Do-it-Yourself (DIY) markets for example, home decoration, window and door assembly and are suitable for use as adhesives in other markets.

Multi component compositions designed to activate condensation cure in the bulk of the product do not use titanium-based catalysts. They generally use other metal catalysts such as tin or zinc catalysts, e.g. dibutyl tin dilaurate, tin octoate and/or zinc octoate (Noll, W.; Chemistry and Technology of Silicones, Academic Press Inc., New York, 1968, p. 397). In sealant compositions stored before use in two or more parts, one-part contains a filler which typically contains the moisture required to activate condensation cure in the bulk of the product. Once mixed together, two-part condensation cure systems, enable bulk cure wherein the composition will cure (subsequent to mixing) throughout the material bulk. If a skin is formed, it will be only in the first minutes after application. Soon after, the product will become a solid in the entire mass. Hence, such two-part systems are particularly suitable for applications requiring thick layers of sealant e.g. greater than 15 mm in depth. Historically, titanate catalysts have not been used for curing these types of two-part compositions because it is well known that, in the presence of a significant amount of moisture, alkyl titanate catalysts will fully hydrolyse to form tetrahydroxy titanate, which loses its catalytic efficiency, leading to uncured systems. Formulations normally using tin as catalyst will not cure properly if the tin catalyst is replaced by an alkyl titanate.

That said, titanate catalysts have been widely used to formulate skin or diffusion cured one-part condensation curing silicone elastomers. These formulations are typically available in one-part packages and function via a skin or diffusion cure process in which a layer of sealant composition of a thickness of e.g. ≤15 mm thick is applied onto a substrate as required and the cure process commences. Skin or diffusion cure by moisture/condensation occurs by the initial formation of a cured skin at the composition/air interface subsequent to the sealant/encapsulant being applied on to a substrate surface. Then after the generation of the surface skin the cure speed is dependent on the speed of diffusion of moisture from the sealant/encapsulant interface with air to the inside (or core), and the diffusion of condensation reaction by-product/effluent from the inside (or core) to the outside (or surface) of the material and the gradual thickening of the cured skin over time from the outside/surface to the inside/core. Titanate cured condensation processes can take e.g. up to seven days curing per 6 mm of depth of the body of the uncured material. Layers having a thickness>15 mm are known to lead to uncured composition in the depth of the elastomeric sealant product, because moisture is very slow at diffusing through to very deep sections.

Whilst tin cured condensation systems cure over a shorter period than titanate cured compositions, particularly when thicker layers are being utilised but the resulting elastomer has the disadvantage that it is not as heat stable as titanium cured systems because they undergo reversion (i.e. depolymerisation) at temperatures above 80° C.

Hence, it would be useful to develop alternative catalyst systems to tin catalysts for two-part cure compositions, but whilst the use of alkyl titanates might seem an obvious alternative catalyst for two-part systems it can be seen that significant challenges exist. Herein, two-part condensation cure silicone formulations are disclosed, which surprisingly can be cured with the use of special titanate and/or zirconate catalyst systems in a significantly faster time than the titanate catalysts alone.

BRIEF SUMMARY OF THE INVENTION

There is provided herein a two-part condensation curable silyl modified polymer (SMP) based sealant composition comprising a base part, Part A, which comprises
- (a) a silyl modified organic polymer having at least two $(R)_m(Y^1)_{3-m}$—Si groups per molecule where each R is hydroxyl or a hydrolysable group, each $Y^1$ is an alkyl group containing from 1 to 8 carbons and m is 1, 2 or 3, which organic polymer is selected from polyethers, hydrocarbon polymers, acrylate polymers, polyesters, polyurethanes and polyureas;
- (b) a reinforcing filler; and optionally (c) and/or (d), wherein
- (c) is one or more plasticisers and
- (d) is one or more stabilizers
  and
  a catalyst package, Part B comprising
- (ai) a silyl modified organic polymer having at least two $(R)_m(Y^1)_{3-m}$—Si groups per molecule where each R is hydroxyl or a hydrolysable group, each $Y^1$ is an alkyl group containing from 1 to 8 carbons and m is 1, 2 or 3, which organic polymer is selected from polyethers, hydrocarbon polymers, acrylate polymers, polyesters, polyurethanes and polyureas (e) a catalyst comprising (i) a titanate and/or zirconate and (ii) a metal carboxylate salt;

(f) an adhesion promoter and optionally (g) and/or (h), wherein (g) is a cross-linker (h) a hydroxy scavenging agent selected from a disilazane or polysilazane.

There is also provided herein a method of making the above composition by mixing part A and part B compositions individually and storing, if required and then mixing Part A and B together in an appropriate weight ratio.

There is also provided herein an elastomeric sealant material which is the cured product of the composition as hereinbefore described.

There is also provided a use of the aforementioned composition as a sealant in the facade, insulated glass, home decoration, window and door assembly solar and construction fields e.g. as a weatherproofing sealant.

There is also provided a method for filling a space between two substrates so as to create a seal therebetween, comprising:

a) providing two-part condensation curable silyl-modified polymer (SMP) based sealant composition as hereinbefore described, and either b) applying the two-part condensation curable silyl-modified polymer (SMP) based sealant compositions to a first substrate, and bringing a second substrate in contact with the two-part condensation curable silyl-modified polymer (SMP) based sealant compositions that has been applied to the first substrate, or c) filling a space formed by the arrangement of a first substrate and a second substrate with the two-part condensation curable silyl-modified polymer (SMP) based sealant composition and curing.

DETAILED DESCRIPTION OF THE INVENTION

The concept of "comprising" where used herein is used in its widest sense to mean and to encompass the notions of "include" and "consist of".

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Component (a) is a silyl modified organic polymer having at least two $(R)_m(Y^1)_{3-m}$—Si groups per molecule where each R is hydroxyl or a hydrolysable group, each $Y^1$ is an alkyl group containing from 1 to 8 carbons and m is 1, 2 or 3.

The $(R)_m(Y^1)_{3-m}$—Si groups of silyl modified organic polymer (a) may be linked to the organic polymer backbone via any suitable linkage or may be directly bonded where appropriate. Typically, the organic polymer is selected from polyethers, hydrocarbon polymers, acrylate polymers, polyurethanes and polyureas. For example, in the case of silyl modified polyether polymers, $(R)_m(Y^1)_{3-m}$—Si groups may be terminal groups linked to the polyether polymer backbone via the following $$(R)_m(Y^1)_{3-m}—Si-D-[NH—C(=O)]_k—$$

Where R, $Y^1$ and m are as hereinbefore described D is a divalent $C_{2-6}$ alkylene group, alternatively a $C_{2-4}$ alkylene group, alternatively an ethylene or propylene group and k is 1 or 0. So a silyl modified polyether might be depicted as $$(R)_m(Y^1)_{3-m}—Si-D-[NH—C(=O)]_k—O[CH(CH_3)—$$
$$CH_2—O]_u—[C(=O)—NH]_k-D-Si(Y^1)_{3-m}(R)_m$$

wherein in the above example the polyether repeating group, for the sake of example, is an oxypropylene group [CH (CH₃)—CH₂—O] with u being the number of repeating units.

Each substituent R in an $(R)_m(Y^1)_{3-m}$—Si group may independently be a hydroxyl group or a hydrolysable group. The hydrolysable groups may be selected from acyloxy groups (for example, acetoxy, octanoyloxy, and benzoyloxy groups); ketoximino groups (for example dimethyl ketoximo, and isobutylketoximino); alkoxy groups (for example methoxy, ethoxy and propoxy) and alkenyloxy groups (for example isopropenyloxy and 1-ethyl-2-methyl-vinyloxy). However, it is preferred that each R is an OH group or an alkoxy group having from 1 to 10 carbons, alternatively an OH group or an alkoxy group having from 1 to 6 carbons, alternatively an OH group, a methoxy group or an ethoxy group, alternatively a methoxy group or an ethoxy group. Substituent $Y^1$ is an alkyl group containing from 1 to 8 carbons, alternatively 1 to 6 carbons, alternatively 1 to 4 carbons. Hence, when R is OH or a hydrolysable group and the hydrolysable group is an alkoxy group, the $(R)_m(Y^1)_{3-m}$—Si groups may be selected from —$(Y^1)$SiOH₂, —$(Y^1)_2$SiOH, —$Y^1$Si$(OR^b)_2$, —Si$(OR^b)_3$, —$(Y^1)_2$SiOR$^b$ with R$^b$ being an alkyl group having from 1 to 8 carbons.

As previously mentioned, the silyl modified organic polymer (a) has an organic backbone having terminal curable silyl groups. The organic polymeric backbone may be selected from polyethers, hydrocarbon polymers, acrylate polymers, polyurethanes and polyureas.

When the silyl modified organic polymer (a) is an alkoxy silyl terminated organic polymer with the organic polymer being a polyether as previously described, the polymer backbone is exemplified as a series of repeating units of the formula:

$$(—C_pH_{2p}—O—)_y$$

wherein p is an integer from 2 to 4 inclusive and y is an integer≥4 i.e. of at least four. An example might be a polyether having the repeating units such as for example, [CH(CH₃)—CH₂—O]$_y$. The number average molecular weight (Mn) of each polyether may range from about 300 to about 10,000 which may be determined by way of ASTM D5296-05 and calculated as polystyrene molecular weight equivalents. Moreover, the oxyalkylene units are not necessarily identical throughout the polyoxyalkylene but can differ from unit to unit. A polyoxyalkylene, for example, can comprise oxyethylene units (—C₂H₄—O—), oxypropylene units (—C₃H₆—O—) or oxybutylene units (—C₄H₈—O—), or mixtures thereof. Preferably the polyoxyalkylene polymeric backbone consists essentially of oxyethylene units or oxypropylene units. Polyoxyalkylenes usually have terminal hydroxyl groups and can readily be modified with moisture curable silyl groups, for example by reaction with an excess of alkyltrialkoxysilane to introduce terminal alkyldialkoxysilyl groups as previously discussed. Alternatively, polymerization may occur via a hydrosilylation type process. SMP type Polyoxyalkylenes consisting wholly or mainly of oxypropylene units have properties suitable for many sealant and/or adhesive applications.

Other polyoxyalkylenes may include for example: units of the structure:

$$-[-R^e-O-(-R^f-O-)_h-Pn-CR^g_2-Pn-O-(-R^f-O-)_{q1}-R^e]-$$

in which Pn is a 1,4-phenylene group, each $R^e$ is the same or different and is a divalent hydrocarbon group having 2 to 8 carbon atoms, each $R^f$ is the same or different and is an ethylene group or propylene group, each $R^g$ is the same or different and is a hydrogen atom or methyl group and each of the subscripts h and q1 is a positive integer in the range from 3 to 30.

Alternatively, the organic polymeric backbone may be an acrylate polymer backbone. The acrylate polymer is an addition polymerised polymer of acrylate and/or methacrylate ester monomers, which comprise at least 50%, (i.e. from 50% to 100%) by weight of the monomer units in the acrylate polymer. Examples of acrylate ester monomers are n-butyl, isobutyl, n-propyl, ethyl, methyl, n-hexyl, n-octyl and 2-ethylhexyl acrylates. Examples of methacrylate ester monomers are n-butyl, isobutyl, methyl, n-hexyl, n-octyl, 2-ethylhexyl and lauryl methacrylates. The acrylate polymer preferably has a glass transition temperature (Tg) below ambient temperature; acrylate polymers are generally preferred over methacrylates since they form lower Tg polymers. Polybutyl acrylate is particularly preferred. The acrylate polymer can contain lesser amounts of other monomers such as styrene, acrylonitrile or acrylamide. The acrylate(s) can be polymerized by various methods such as conventional radical polymerization or living radical polymerization such as atom transfer radical polymerization, reversible addition—fragmentation chain transfer polymerization, or anionic polymerization including living anionic polymerisation.

Silyl modified organic polymer (a) may also be a silyl modified hydrocarbon polymer. Examples of silyl modified hydrocarbon polymers include silyl modified polyisobutylene. Silyl modified polyisobutylene can for example contain curable silyl groups derived from a silyl-substituted alkyl acrylate or methacrylate monomer such as alkoxydialkylsilylpropyl methacrylate, dialkoxyalkylsilylpropyl methacrylate or trialkoxysilylpropyl methacrylate, which can be reacted with a polyisobutylene.

Silyl modified organic polymer (a) may be present in part A of the composition in an amount of from 50 to 96% by weight of part A of the composition alternatively from 60 to 96% by weight of the part A composition, alternatively from 70 to 95.5% by weight of the part A composition.

The base part or Part A of the two-part condensation curable silyl modified polymer (SMP) based adhesive composition also comprises a reinforcing filler (b) in the form of one or more finely divided, reinforcing fillers such as precipitated calcium carbonate, fumed silica, colloidal silica and/or precipitated silica including, for example, rice hull ash or a mixture thereof. Typically, the surface area of the reinforcing filler (b) is at least 15 m²/g in the case of precipitated calcium carbonate measured in accordance with the BET method (ISO 9277: 2010), alternatively 15 to 50 m²/g, alternatively 15 to 25 m²/g in the case of precipitated calcium carbonate. Silica reinforcing fillers have a typical surface area of at least 50 m²/g. In one embodiment reinforcing filler (b) is a precipitated calcium carbonate, precipitated silica and/or fumed silica; alternatively, precipitated calcium carbonate. In the case of high surface area fumed silica and/or high surface area precipitated silica, these may have surface areas of from 75 to 400 m²/g measured in accordance with the BET method (ISO 9277: 2010), alternatively of from 75 to 300 m²/g in accordance with the BET method (ISO 9277: 2010).

Typically, the reinforcing fillers (b) are present in the base composition in an amount of from 4 to 40% by weight of the composition, alternatively of from 4.5 to 30% by weight of the composition, alternatively from 4.5 to 25% by weight of the composition.

Reinforcing filler (b) may be hydrophobically treated, for example, with one or more aliphatic acids, e.g. a fatty acid such as stearic acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other adhesive components. The surface treatment of the fillers makes them easily wetted by silyl modified organic polymer (a) of the base component. These surface modified fillers do not clump and can be homogeneously incorporated into the silyl modified organic polymer (a) of the base component. This results in improved room temperature mechanical properties of the uncured compositions. The fillers (b) may be pre-treated or may be treated in situ when being mixed with silyl modified organic polymer (a).

The base composition may optionally also comprise components (c) and/or (d),
  wherein
  (c) is one or more plasticisers and
  (d) is one or more stabilizers.

Given the fact that the backbone of silyl modified organic polymer (a) is substantially organic (i.e. not containing Si—O—Si bonds in the polymer backbone), when present, the plasticisers (c) are generally selected from those which are suitable for plasticizing silyl modified organic polymer (a).

Examples of plasticizers (c) include, but are not limited to: —
  Divalent alcohols (e.g. ethylene glycol, diethylene glycol, triethylene glycol, propylene glycol, dipropylene glycol); polyether polyols (e.g. polyethylene glycol, polypropylene glycol, polytetramethylene glycol and/or hydroxyl terminated polypropylene/polyethylene ether co-polymers which have a molecular weight of 500 or higher, or even of 1,000 or higher, such as commercially available hydroxyl terminated polypropylene ethers sold under the VORANOL Trade Mark by The Dow Chemical Company;
  Polyether derivatives obtained by converting the hydroxy groups of these polyether polyols into ester groups, ether groups or other groups; Alkoxy terminated polypropylene ethers, alkoxy terminated polyethylene ethers, alkoxy terminated polypropylene/polyethylene ether co-polymers esters of polyalkylene glycols, such as diethylene glycol dibenzoate, triethylene glycol dibenzoate, and pentaerythritol esters;
  Polyester plasticizers prepared from dibasic acids (e.g. sebacic acid, adipic acid, azelaic acid, phthalic acid) i.e. phthalic acid esters such as dibutyl phthalate, diheptyl phthalate, bis(2-ethylhexyl)phthalate, diisononyl phthalate (DINP) diisodecyl phthalate (DIDP), dioctyl phthalate (DOP) diisooctylphthalate (DIOP), and butyl benzyl phthalate; cyclohexanedicarboxylates obtained by hydrogenating the above phthalic acid esters such as those marketed by BASF under the trade name Hexamoll DINCH;

Non-aromatic dibasic acid esters such as dioctyl adipate, dioctyl sebacate, dibutyl sebacate, and isodecyl succinate; cyclohexanedicarboxylic acid esters such as diisononyl cyclohexanedicarboxylate and bis(2-ethylhexyl)cyclohexanedicarboxylate; aliphatic esters such as butyl oleate and methyl acetyl ricinolate; phosphoric acid esters such as tricresyl phosphate and tributyl phosphate; trimellitic acid esters; and/or Hydrocarbon oils such as alkyl diphenyls and partially hydrogenated terphenyls.

When present plasticiser (c) is typically present in an amount of up to 40% by weight of the composition.

Stabilizers (d) may be one or more of, for the sake of example, anti-oxidants, UV and/or light stabilizers and light stabilizers, or the like.

Any suitable anti-oxidant(s) may be utilised as stabilizer (d), if deemed required. Examples may include: ethylene bis (oxyethylene) bis(3-tert-butyl-4-hydroxy-5(methylhydrocinnamate) 36443-68-2; tetrakis[methylene(3,5-di-tert-butyl-4-hydroxy hydrocinnamate)]methane 6683-19-8; octadecyl 3,5-di-tert-butyl-4-hydroxyhyrocinnamate 2082-79-3; N,N'-hexamethylene-bis (3,5-di-tert-butyl-4-hydroxy-hyrocinnamamide) 23128-74-7; 3,5-di-tert-butyl-4-hydroxyhydrocinnamic acid, C7-9 branched alkyl esters 125643-61-0; N-phenylbenzene amine, reaction products with 2,4,4-trimethylpentene 68411-46-1; e.g. anti-oxidants sold under the Irganox® name from BASF.

UV and/or light stabilisers may include, for the sake of example, benzotriazole, ultraviolet light absorbers and/or hindered amine light stabilizers (HALS) such as the TINUVIN® product line from Ciba Specialty Chemicals Inc.

When present stabilizer(s) (d) are typically present up to 5% by weight of the part A composition, alternatively in an amount of from 0.1 to 4% by weight of the composition, alternatively 0.1 to 2% by weight of the composition.

The catalyst package, Part B of the composition comprises (ai) a silyl modified organic polymer having at least two $(R)_m(Y^1)_{3-m}$—Si groups per molecule where each R is hydroxyl or a hydrolysable group, each $Y^1$ is an alkyl group containing from 1 to 8 carbons and m is 1, 2 or 3, which organic polymer is selected from polyethers, hydrocarbon polymers, acrylate polymers, polyesters, polyurethanes and polyureas (e) a catalyst comprising (i) a titanate and/or zirconate and (ii) a metal carboxylate salt;

(f) an adhesion promoter and optionally components (g) and/or (h), wherein (g) is a cross-linker; and (h) a moisture scavenger selected from a disilazane or polysilazane.

Silyl modified organic polymer (ai) in the catalyst package or part B of the composition is defined as any silyl modified organic polymer (a) as described above. The silyl modified organic polymer (ai) should be compatible with silyl modified organic polymer (a) in the base part or part A of the composition when part A and Part B are mixed together prior to use. In one embodiment silyl modified organic polymer (a) in the base part (part A) and silyl modified organic polymer (ai) in the catalyst package (part B) are the same or substantially the same, i.e. of the same general structure but not necessarily the same viscosity or number average molecular weight, or the like. Silyl modified organic polymer (ai) is present in part B of the composition in an amount of from 50 to 97.9% by weight of part B of the composition alternatively from 60 to 96% by weight of the part B composition, alternatively from 70 to 95.5% by weight of the part B composition;

As hereinbefore described the catalyst (e) comprises (i) a titanate and/or zirconate and (ii) a metal carboxylate salt. The titanate and/or zirconate (i) in catalyst (e) is chosen for inclusion in a sealant composition as defined herein dependent upon the speed of cure required. Titanate and/or zirconate based catalysts may comprise a compound according to the general formula $Ti[OR^9]_4$ or $Zr[OR^9]_4$ where each $R^9$ may be the same or different and represents a monovalent, primary, secondary or tertiary aliphatic hydrocarbon group which may be linear or branched containing from 1 to 10 carbon atoms. Optionally the titanate and/or zirconate based catalysts may contain partially unsaturated groups. However, preferred examples of $R^9$ include but are not restricted to methyl, ethyl, propyl, isopropyl, butyl, tertiary butyl and a branched secondary alkyl group such as 2, 4-dimethyl-3-pentyl. Preferably, when each $R^9$ is the same, $R^9$ is an isopropyl, branched secondary alkyl group or a tertiary alkyl group, in particular, tertiary butyl. Suitable examples include for the sake of example, tetra n-butyl titanate, tetra t-butyl titanate, tetra t-butoxy titanate and tetraisopropoxy titanate (as well as zirconate equivalents). Alternatively, the titanate/zirconate may be chelated. The chelation may be with any suitable chelating agent such as an alkyl acetylacetonate such as methyl or ethylacetylacetonate, for example diisopropoxydiethylacetoacetate titanate. Alternatively, the titanate may be monoalkoxy titanates bearing three chelating agents such as for example 2-propanolato, tris isooctadecanoato titanate. In one embodiment (i) is a titanate or chelated titanate.

In the present disclosure catalyst (e) also comprises (ii) a metal carboxylate salt wherein the metal is selected from one or more of zinc, aluminium, bismuth, iron and/or zirconium. The carboxylate groups are of the formula $R^{15}COO^-$ where $R^{15}$ is selected from hydrogen, alkyl groups, alkenyl groups, and aryl groups. Examples of useful alkyl groups for $R^{15}$ include alkyl groups having from 1 to 18 carbon atoms, alternatively 1 to 8 carbon atoms. Examples of useful alkenyl groups for $R^{15}$ include alkenyl groups having from 2 to 18 carbon atoms, alternatively 2 to 8 carbon atoms such as vinyl, 2-propenyl, allyl, hexenyl, and octenyl. Examples of useful aryl groups for $R^{15}$ include aryl groups having from 6 to 18 carbon atoms, alternatively 6 to 8 carbon atoms such as phenyl and benzyl. Alternatively, $R^{15}$ is methyl, 2-propenyl, allyl, and phenyl. Hence the metal carboxylate salt (ii) in catalyst (e) may be zinc (II) carboxylates, aluminium (III) carboxylates, bismuth (III) carboxylates and/or zirconium (IV) carboxylates, zinc (II) alkylcarboxylates, aluminium (III) alkylcarboxylates, bismuth (III) alkylcarboxylates and/or zirconium (IV) alkylcarboxylates or mixtures thereof. Specific examples of metal carboxylate salt (ii) in catalyst (e) include, zinc ethylhexanoate, bismuth ethylhexanoate, zinc stearate, zinc undecylenate, zinc neodecanoate, and iron (III) 2-ethylhexanoate. The titanate and/or zirconate (i) and metal carboxylate salt (ii) of catalyst (e) is provided in a molar ratio of 1:4 to 4:1.

The catalyst (e) is present in the composition in an amount of from 1 to 10% by weight of the part B composition, alternatively from 2 to 9% by weight of the part B composition Although not preferred, if deemed appropriate or necessary, optionally catalyst (e) may also additionally include a tin catalyst. The additional tin based condensation catalyst may be any catalyst suitable for catalysing the cure of the total composition subsequent to mixing the base component (Part A) and catalyst package (Part B) together. Said tin catalyst, if used, must be compatible with the other components of the catalyst (e).

Component (f) stored in part B of the composition is an adhesion promoter. Suitable adhesion promoters (1) may comprise alkoxysilanes of the formula $R^{14}{}_h Si(OR^{13})_{(4-h)}$, where subscript h is 1, 2, or 3. Each $R^{14}$ is independently a monovalent organofunctional group. $R^{14}$ can be an epoxy functional group such as glycidoxypropyl or (epoxycyclo-hexyl)ethyl, an amino functional group such as aminoeth-ylaminopropyl or aminopropyl, a methacryloxypropyl, a mercapto functional group such as mercaptopropyl or an unsaturated organic group. Each $R^{13}$ is independently an unsubstituted, saturated hydrocarbon group of at least 1 carbon atom. $R^{13}$ may have 1 to 4 carbon atoms, alternatively 1 to 2 carbon atoms. $R^{13}$ is exemplified by methyl, ethyl, n-propyl, and iso-propyl.

Alternatively the adhesion promoter (f) may be glycidoxypropyltrimethoxysilane or a multifunctional material obtained by reacting two or more of the above. For examples the reaction product of an alkylalkoxysilicone e.g. trimethoxymethylsilane; an aminoalkoxysilane, e.g. 3-ami-nopropyl trimethoxysilane and an epoxyalkoxysilane e.g. glycidoxypropyl trimethoxysilane; in a weight ratio of (i):(ii):(iii) of 0.1-6:0.1-5:1.

Examples of suitable adhesion promoters (f) may also include molecules of the structure $$(R'O)_3 Si(CH_2)_n N(H)—(CH_2)_z NH_2$$

in which each R' may be the same or different and is an alkyl group containing from 1 to 10 carbon atoms, n is from 2 to 10 and z is from 2 to 10;

Adhesion promoter (f) may be present in the catalyst package (part B) or catalyst package in an amount of from 0.1 to 25% by weight of the catalyst package (part B) composition. Preferably, the speed of hydrolysis of adhesion promoter (f) should be lower than the speed of hydrolysis of the cross-linker in order to favour diffusion of the molecule towards the substrate rather than its incorporation in the product network.

As hereinbefore described the catalyst package (Part B) of the two-component composition may optionally contain components (g) and/or (h), wherein (g) is a cross-linker (h) a moisture scavenger selected from a disilazane or polysilazane hydroxy scavenging agent;

Cross-linker (g), when present, may be selected from a silane having the structure $$R^6{}_j Si(OR^5)_{4-j}$$

where each $R^5$ may be the same or different and is an alkyl group containing at least one carbon, alternatively from 1 to 20 carbons, alternatively from 1 to 10 carbons alternatively from 1 to 6 carbons. The value of j is 0 or 1. Whilst each $R^5$ group may be the same of different it is preferred that at least two $R^5$ groups are the same, alternatively at least three $R^5$ groups are the same and alternatively when j is 0 all $R^5$ groups are the same. Hence, specific examples of cross-linker (g) when j is zero include tetraethylorthosilicate, tetrapropylorthosilicate, tetra(n-) butylorthosilicate and tetra (t-)butylorthosilicate.

When j is 1 the group $R^6$ is present. $R^6$ is a silicon-bonded organic group selected from a substituted or unsubstituted straight or branched monovalent hydrocarbon group having at least 1 carbon, a cycloalkyl group, an aryl group, an aralkyl group or any one of the foregoing wherein at least one hydrogen atom bonded to carbon is substituted by a halogen atom, or an organic group having an epoxy group, a glycidyl group, an acyl group, a carboxyl group, an ester group, an amino group, an amide group, a (meth)acryl group, a mercapto group an isocyanurate group or an iso-cyanate group. Unsubstituted monovalent hydrocarbon groups, suitable as $R^6$, may include alkyl groups e.g. methyl, ethyl, propyl, and other alkyl groups, alkenyl groups such as vinyl, cycloalkyl groups may include cyclopentane groups and cyclohexane groups. Substituted groups suitable in or as $R^6$, may include, for the sake of example, 3-hydroxypropyl groups, 3-(2-hydroxyethoxy)alkyl groups, halopropyl groups, 3-mercaptopropyl groups, trifluoroalkyl groups such as 3,3,3-trifluoropropyl, 2,3-epoxypropyl groups, 3,4-ep-oxybutyl groups, 4,5-epoxypentyl groups, 2-glycidoxyethyl groups, 3-glycidoxypropyl groups, 4-glycidoxybutyl groups, 2-(3,4-epoxycyclohexyl) ethyl groups, 3-(3,4-ep-oxycyclohexyl)alkyl groups, aminopropyl groups, N-meth-ylaminopropyl groups, N-butylaminopropyl groups, N,N-dibutylaminopropyl groups, 3-(2-aminoethoxy)propyl groups, methacryloxyalkyl groups, acryloxyalkyl groups, carboxyalkyl groups such as 3-carboxypropyl groups, 10-carboxydecyl groups.

Specific examples of suitable cross-linkers (g) include but are not limited to vinyltrimethoxysilane, methyltrimethox-ysilane, ethyltriethoxysilane, ethyltrimethoxysilane, propy-ltriethoxysilane, isobutyltriethoxysilane, isobutyltrimethox-ysilane, vinyltriethoxysilane, phenyltriethoxysilane, phenyltrimethoxysilane, methyltris(isopropenoxy)silane or vinyltris(isopropenoxy)silane, 3-hydroxypropyl triethoxysi-lane, 3-hydroxypropyl trimethoxysilane, 3-(2-hydroxy-ethoxy)ethyltriethoxysilane, 3-(2-hydroxyethoxy)ethylt-rimethoxysilane, chloropropyl triethoxysilane, 3-mercaptopropyl triethoxysilane, 3,3,3-trifluoropropyl tri-ethoxysilane, 2,3-epoxypropyl triethoxysilane, 2,3-epoxy-propyl trimethoxysilane, 3,4-epoxybutyl triethoxysilane, 3,4-epoxybutyl trimethoxysilane, 4,5-epoxypentyl triethox-ysilane, 4,5-epoxypentyl trimethoxysilane, 2-glycidoxy-ethyl triethoxysilane, 2-glycidoxyethyl trimethoxysilane, 3-glycidoxypropyl triethoxysilane, 3-glycidoxypropyl trimethoxysilane, 4-glycidoxybutyl triethoxysilane, 4-glyci-doxybutyl trimethoxysilane, 2-(3,4-epoxycyclohexyl) ethyl triethoxysilane, 3-(3,4-epoxycyclohexyl)ethyl triethoxysi-lane, aminopropyl triethoxysilane, aminopropyl trimethox-ysilane, N-methylaminopropyl triethoxysilane, N-methyl-aminopropyl trimethoxysilane, N-butylaminopropyl trimethoxysilane, N,N-dibutylaminopropyl triethoxysilane, 3-(2-aminoethoxy)propyl triethoxysilane, methacryloxypro-pyl triethoxysilane, tris(3-triethoxysilylpropyl) isocyanu-rate, acryloxypropyl triethoxysilane, 3-carboxypropyl tri-ethoxysilane and 10-carboxydecyl triethoxysilane.

Cross-linker (g) is an optional additive and may be present in an amount of up to 25% by weight of the catalyst package (part B) composition.

When present, scavenger (h) may be any suitable mois-ture/water/—OH scavenger selected from silazanes and polysilazanes. Any suitable disilazane or polysilazane hydroxy scavenging agent may be used, for example sila-zanes which may be linear or cyclic such as hexamethyld-isilazane, hexamethylcyclotrisilazane. octamethyltetrasila-zane, trimethyltriphenylcyclotrisilazane, trivinyltrimethylcyclotrisilazane. Component (h) may also be one or more and polysilazanes i.e. polymers containing repeating units such as arylensilazanes, such as phenylene silazanes, and alkylenesilazanes such as methylenesilazanes repeating units such as the specific examples are: Hexam-ethyldisilazane and hexamethylcyclotrisilazane. octamethyltetrasilazane, trimethyltriphenylcyclotrisilazane and/or trivinyltrimethylcyclotrisilazane.

Scavenger (h) is an optional ingredient in catalyst package (part B) of the composition but if present may be present in an amount of up to 10% by weight of the Catalyst package (part B) composition.

Part B of the composition may optionally also comprise one or more reinforcing fillers as described for ingredient (b) of part A of the composition. The filler in part B will typically be present in an amount of from 0 to 10% by weight of the composition.

Other additives may be used if necessary. These may include pigments, rheology modifiers, cure modifiers, and fungicides and/or biocides and the like. It will be appreciated that some of the additives are included in more than one list of additives. Such additives would then have the ability to function in all the different ways referred to.

Pigments are utilized to color the composition as required. Any suitable pigment may be utilized providing it is compatible with the composition. In two-part compositions pigments and/or colored (non-white) fillers, e.g. carbon black may be utilized in the catalyst package to color the end adhesive product. When present carbon black will function as both a non-reinforcing filler and colorant and is present in a range of from 1 to 30% by weight of the catalyst package composition, alternatively from 1 to 20% by weight of the catalyst package composition; alternatively from 5 to 20% by weight of the catalyst package composition, alternatively from 7.5 to 20% by weight of the catalyst composition.

Rheology modifiers which may be incorporated in moisture curable compositions according to the invention include silicone organic co-polymers such as those described in EP0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion to substrates, particularly plastic substrates.

Biocides may additionally be utilized in the composition if required. It is intended that the term "biocides" includes bactericides, fungicides and algicides, and the like. Suitable examples of useful biocides, which may be utilized in compositions as described herein, include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl]methyl]-1H-1,2,4-triazole.

The fungicide and/or biocide may suitably be present in an amount of from 0 to 0.3% by weight of the composition and may be present in an encapsulated form where required such as described in EP2106418.

Hence, the part A composition may comprise:
a silyl modified organic polymer (a) in an amount of from 50 to 96% by weight of part A of the composition alternatively from 60 to 96% by weight of the part A composition, alternatively from 70 to 95.5% by weight of the part A composition;
reinforcing filler (b) in an amount of from 4 to 40% by weight of the composition, alternatively of from 4.5 to 30% by weight of the composition, alternatively from 4.5 to 25% by weight of the composition;
one or more plasticisers (c) in an amount of from 0 to 40% by weight of the part A composition and
one or more stabilizers (d) in an amount of from 0 to 5% by weight of the part A composition,
alternatively in an amount of from 0.1 to 4% by weight of the part A composition, alternatively 0.1 to 2% by weight of the part A composition and/or any combination thereof providing the total weight % of any part A composition is 100%.
Furthermore, the part B composition may comprise
The catalyst package, Part B of the composition comprises
a silyl modified organic polymer (ai) from 50 to 97.9% by weight of part B of the composition alternatively from 60 to 96% by weight of the part B composition, alternatively from 70 to 95.5% by weight of the part B composition;
a catalyst (e) in an amount of from 2 to 10% by weight of the part B composition, alternatively from 3 to 9% by weight of the part B composition;
an adhesion promoter (f) in an amount of from 0.1 to 25% by weight of the part B composition alternatively from 0.1 to 15% by weight of the part B composition;
a cross-linker (g) of from 0 to 25% by weight of the part B composition; and
a moisture scavenger (h) in an amount of from 0 to 10 by weight of part B of the composition and/or any combination thereof providing the total weight % of any part A composition is 100%. The amounts of each component in parts A and B of the composition will be varied dependent on the ratio of part A and part B are to be mixed or vice versa.

The compositions are preferably room temperature vulcanisable compositions in that they cure at room temperature without heating but may if deemed appropriate be accelerated by heating.

The compositions of the bases (part A) and the catalyst package (part B) can be prepared by mixing the ingredients employing any suitable mixing equipment. The additional optional components may be added in either part A or Part B as deemed appropriate.

The part A composition may be prepared by adding the ingredients into a suitable mixer and mixing until the ingredients were thoroughly mixed. For example, Part A may be introduced into a mixer and mixed for any suitable time, typically at room temperature (23° C.) and a suitable relative humidity (RH) and then may be stored until use under substantially anhydrous conditions, for example in sealed containers. Any suitable mixer may be used, for example, a speed mixer or turello mixer or the like.

Likewise, the Catalyst package (part B) ingredients may be introduced into a mixer and mixed for any suitable time, typically at room temperature (23° C.) and a suitable relative humidity (RH) and then may be stored until use under substantially anhydrous conditions, for example in sealed containers.

There is also provided herein a method of making the above composition by mixing part A and part B compositions individually and storing, if required and then mixing Part A and B together in an appropriate weight ratio. The part A and part B compositions are mixed together prior to use to make a curable composition. The part A and part B compositions are added together in a suitable weight ratio which is dependent on the amounts of ingredients in each part. For example, the weight ratio for Part A:Part B might be from say 15:1 to 1 to 1 dependent on the concentration of the different ingredients.

As hereinbefore described there is also provided herein an elastomeric sealant material which is the cured product of the composition as hereinbefore described.

There is also provided a method for filling a space between two substrates so as to create a seal therebetween, comprising:

(a) providing two-part condensation curable silyl-modified polymer (SMP) based sealant composition as hereinbefore described, and either (b) applying the two-part condensation curable silyl-modified polymer (SMP) based sealant compositions to a first substrate, and bringing a second substrate in contact with the two-part condensation curable silyl-modified polymer (SMP) based sealant compositions that has been applied to the first substrate, or (c) filling a space formed by the arrangement of a first substrate and a second substrate with the two-part condensation curable silyl-modified polymer (SMP) based sealant composition and curing.

Sealants prepared by curing compositions as hereinbefore described are widely used in sealant and/or adhesive applications for example, the facade, insulated glass, home decoration, window and door assembly solar and construction fields e.g. as a weatherproofing sealant. They are particularly useful in sealing gaps between deep joints (i.e. joints requiring thick layers of sealant because two-part sealant compositions described herein have the advantage of the ability to provide deep section cure especially when compared to one-part compositions which are not able to cure completely in such situations.

EXAMPLES

All viscosities mentioned were measured at 25° C. using a Brookfield® HAF viscometer using spindle No. 7 at 20 rpm. Dumbbell shaped Test pieces were used for all testing in accordance with ASTM D412-98a(2002e1).

A series of examples have been prepared and are compared with a two-part reference material. The formulation of Part A composition is depicted in Table 1 below.

TABLE 1

| Part A composition of Examples (wt. %) | | | | | |
|---|---|---|---|---|---|
| Part A Composition | Ex. 1 | Ex. 2 | Ex. 3 | Ex. 4 | Ex. 5 |
| Kaneka S303H SMP Polymer | 74 | 74 | 74 | 74 | 74 |
| Dow Voranol ™ 3003LM Plasticizer | 15 | 15 | 15 | 15 | 15 |
| Wacker HDK ® V15D Untreated fumed Silica | 11 | 11 | 11 | 11 | 11 |

Kaneka S303H SMP Polymer is a branched methyldimethoxysilane terminated polyether, without Urethane bond, viscosity 13,000 mPa·s at 25° C. commercially available from Kaneka. Voranol™ 3003LM is a hydroxyl terminated Polypropylene ether from the Dow Chemical Co. and HDK® V15D is an untreated fumed silica, with BET 130-170 m²/g, commercially available from Wacker Chimie AG The part A composition was prepared by adding the ingredients into a speed mixer and mixing 40 seconds at 2000 rpm at approximately room temperature (23° C.) and 50% relative humidity (RH) and then was stored.

The formulation of the catalyst package (Part B) composition is depicted in Tables 2a and 2b below:

TABLE 2a

| catalyst package (Part B) composition of Examples | | | | | |
|---|---|---|---|---|---|
| Part B Composition | Ex. 1 | Ex. 2 | Ex. 3 | Ex. 4 | Ex. 5 |
| methyltrimethoxysilane | 4 | 4 | 4 | 4 | 4 |
| Adhesion Promoter | 5.8 | 5.8 | 5.8 | 5.8 | 5.8 |
| Kaneka SAX520 | 79.2 | 79.2 | 79.2 | 79.2 | 79.2 |
| Evonik Aerosil ® R208 | 3 | 3 | 3 | 3 | 3 |
| Catalyst (See below) | 8 | 8 | 8 | 8 | 8 |

Kaneka SAX520 is a branched trimethoxysilane terminated polyether, without Urethane bond, viscosity 52,000 mPa·s at 25° C. Aerosil® R208 is a silicone oil-treated fumed silica, with BET 80-140 m²/g, from EVONIK. The adhesion promoter used was the reaction product of a mixture of Trimethoxymethylsilane, 3-aminopropyl trimethoxysilane, and glycidoxypropyl trimethoxysilane.

The catalysts used in the composition depicted in Table 2a are listed in the following Table 2b.

TABLE 2b

| Description of Catalysts in Examples 1 to 5 | |
|---|---|
| | Catalyst |
| Ex. 1 | Tetra t-butyl titanate (TtBT) + zinc Ethylhexanoate (Zn(EHA)₂) (2:1 mol) premix |
| Ex. 2 | TtBT + Zn(EHA)₂ (2:1 mol) separately adding |
| Ex. 3 | TtBT + Zn(EHA)₂ (4:1 mol) |
| Ex. 4 | TtBT + Zn(EHA)₂ (1:4 mol) |
| Ex. 5 | TtBT + bismuth ethylhexanoate (Bi(EHA)₃) (2:1 mol) |

The catalyst package (part B) composition was also prepared by adding the ingredients into a speed mixer and mixing 40 seconds at 2000 rpm at approximately room temperature (23° C.) and 50% relative humidity (RH) and then was stored.

In order to effect cure of the total composition Parts A and B were mixed together in a weight ratio of Part A:Part B of 3:1. The combined amounts were added into a speed mixer and mixed again for 40 seconds at 2000 rpm at approximately room temperature (23° C.) and 50% relative humidity (RH). The resulting prepared compositions were cured for 7 days at room temperature (approximately 23° C. and 50% RH) and then had physical properties analysed.

Snap time is measured by gently touching at regular time intervals (typically 2-3 min) a spatula into the curing composition. As the cure progresses, the coating gains viscosity and elasticity. When these two are sufficiently high, the coating "snaps off" the spatula. The time elapsed between the casting of the coating and the first observation of the snap-off effect is recorded as snap time. This value has practical importance, because it provides an indication about the working time of the coating. The working time is defined as the time which the applicator is able to work with the material before the latter reaches a state of sufficiently high viscosity which prevents it from being properly handled and tooled. Snap time is used as a rough estimation of the working time.

TABLE 3

| Physical Properties of Examples 1 to 5 | | | | | |
|---|---|---|---|---|---|
| Properties | Ex. 1 | Ex. 2 | Ex. 3 | Ex. 4 | Ex. 5 |
| Snap Time (h) | 4 | 4 | 5 | <24 | 24 |
| Tensile Strength (MPa) (ASTM D412-98a(2002e1)) (7d RT cure) | 1.65 | 1.62 | 2.22 | 2.11 | 0.97 |
| Elongation (%) (ASTM D412-98a (2002e1)) (7d RT cure) | 223 | 227 | 284 | 318 | 271 |
| Modulus @ 100% Extension (MPa)) (ASTM D412-98a (2002e1)) (7d RT cure) | 0.77 | 0.76 | 0.78 | 0.63 | 0.37 |

A series of comparative composition were also prepared. The part A compositions for these were identical to those in the above.

TABLE 4

| Part A composition of Comparatives | | | | |
|---|---|---|---|---|
| Part A | Comp. 1 | Comp. 2 | Comp. 3 | Comp. 4 |
| Kaneka S303H SMP Polymer | 74 | 74 | 74 | 74 |
| Dow Voranol ™ 3003LM Plasticizer | 15 | 15 | 15 | 15 |
| Wacker HDK ® V15D Untreated fumed Silica | 11 | 11 | 11 | 11 |

The catalyst packages of the comparatives are disclosed in Table 5 below:

TABLE 5

| Catalyst Package (Part B) composition of Comparatives | | | | |
|---|---|---|---|---|
| Part B | Comp. 1 | Comp. 2 | Comp. 3 | Comp. 4 |
| methyltrimethoxysilane | 4 | 4 | 4 | 4 |
| Adhesion Promoter | 5.8 | 5.8 | 5.8 | 5.8 |
| Kaneka SAX520 | 82.3 | 79.2 | 84.1 | 79.2 |
| Evonik Aerosil ® R208 | 3 | 3 | 3 | 3 |
| TtBT | 4.9 | 8 | | |
| Zn(EHA)$_2$ | | | 3.1 | |
| Bi(EHA)$_3$ | | | | 8 |

Some physical properties of the comparative compositions were tested and are provided in Table. 6 below:

TABLE 6

| Physical Property results of Comparatives | | | | |
|---|---|---|---|---|
| Properties | Comp. 1 | Comp. 2 | Comp. 3 | Comp. 4 |
| Snap Time (h) | >24 | 24 | uncured | uncured |
| Tensile Strength (MPa)) (ASTM D412-98a(2002el)) (7d RT cure) | 0.19 | 2.36 | uncured | uncured |
| Elongation (%)) (ASTM D412-98a(2002e1)) (7d RT cure) | 166 | 340 | uncured | uncured |
| Modulus @ 100% Extension (MPa)) (ASTM D412-98a (2002e1)) (7d RT cure) | 0.17 | 0.67 | uncured | uncured |

It will be observed that the catalyst (e), particularly when consisting of a titanate and a zinc carboxylate combination gives a much faster cure than using only the equivalent amount of the titanate catalyst alone as seen in ex. 1 and comp. 1. Comp. 3 is provided to show that the Zn(EHA)$_2$ when used on its own as catalyst showed very limited catalytic effect, its combination with the titanate clearly demonstrates an unexpected synergistic effect, again when comparing ex. 1 to comp. 1 and 3.

Whilst very high levels of titanate can be seen to cure two-part compositions described above (comp. 2), the cure is much slower than when using the catalyst (e) herein, snap time of 24 hours and furthermore provides the added disadvantage of the likelihood of increasing discolouration (whitening and/or yellowing when utilised at such levels a, feature that users of translucent sealants seek to avoid, and consider a major issue. One advantage of utilizing the synergistic effect seen using the catalyst combination herein is that the need for levels of titanate catalyst means a much lower risk of discolouration with time.

What is claimed is:

1. A two-part condensation curable silyl modified polymer-based sealant composition comprising a base part, Part A, and a catalyst package, Part B, wherein the base part comprises:
    (a) a silyl modified organic polymer having at least two (R)$_m$(Y$^1$)$_{3-m}$—Si— groups per molecule where each R is hydroxyl or a hydrolysable group, each Y$^1$ is an alkyl group containing from 1 to 8 carbons and m is 1, 2 or 3, which organic polymer is selected from polyethers, hydrocarbon polymers, acrylate polymers, polyesters, polyurethanes, and polyureas; and
    (b) a reinforcing filler; and
    optionally, further comprising:
    (c) one or more plasticisers; and/or
    (d) one or more stabilizers; and
wherein the catalyst package comprises:
    (ai) a silyl modified organic polymer having at least two (R)$_m$(Y$^1$)$_{3-m}$—Si— groups per molecule where each R is hydroxyl or a hydrolysable group, each Y$^1$ is an alkyl group containing from 1 to 8 carbons and m is 1, 2 or 3, which organic polymer is selected from polyethers, hydrocarbon polymers, acrylate polymers, polyesters, polyurethanes, and polyureas;
    (e) a catalyst comprising (i) a titanate and (ii) a zinc carboxylate salt comprising:
        zinc, and
        a carboxylate group conforming to the formula R$^{15}$COO$^-$, where R$^{15}$ is an alkyl group; and
    (f) an adhesion promoter; and
    optionally, further comprising:
    (g) a cross-linker; and/or
    (h) a hydroxy scavenging agent selected from a disilazane or polysilazane; and
    wherein the titanate (i) and the zinc carboxylate salt (ii) of catalyst (e) is provided in a molar ratio of 4:1 to 2:1.

2. The two-part condensation curable silyl modified polymer-based sealant composition in accordance with claim 1, wherein the zinc carboxylate salt (ii) is selected from the group consisting of zinc (II) carboxylates, zinc (II) alkylcarboxylates, and combinations thereof.

3. The two-part condensation curable silyl modified polymer-based sealant composition in accordance with claim 1, wherein the zinc carboxylate salt (ii) is selected from the group consisting of zinc ethylhexanoate, zinc stearate, zinc undecylenate, and zinc neodecanoate.

4. The two-part condensation curable silyl modified polymer-based sealant composition in accordance with claim 1, wherein silyl modified organic polymer (a) and/or silyl modified organic polymer (ai) is a polyether terminated with $$(R)_m(Y^1)_{3-m}—Si-D-[NH—C(=O)]_k—$$

where each R is hydroxyl or a hydrolysable group, each $Y^1$ is an alkyl group containing from 1 to 8 carbons, m is 1, 2 or 3, D is a divalent $C_{2-6}$ alkylene group, and k is 1 or 0.

5. The two-part condensation curable silyl modified polymer-based sealant composition in accordance claim 4, wherein k is 0.

6. The two-part condensation curable silyl modified polymer-based sealant composition in accordance with claim 1, wherein Part A comprises:

silyl modified organic polymer (a) in an amount of from 50 to 96% by weight of Part A;

reinforcing filler (b) in an amount of from 4 to 40% by weight of Part A;

one or more plasticisers (c) in an amount of from 0 to 40% by weight of Part A; and one or more stabilizers (d) in an amount of from 0 to 5% by weight of Part A;

wherein the total weight % of any Part A of the composition is 100%.

7. The two-part condensation curable silyl modified polymer-based sealant composition in accordance with claim 1, wherein Part B comprises:

silyl modified organic polymer (ai) in an amount of from 50 to 97.9% by weight of Part B;

catalyst (e) in an amount of from 2 to 10% by weight of Part B;

adhesion promoter (f) in an amount of from 0.1 to 25% by weight of Part B;

cross-linker (g) in an amount of from 0 to 25% by weight of Part B; and moisture scavenger (h) in an amount of from 0 to 10% by weight of Part B;

wherein the total weight % of any Part B of the composition is 100%.

8. The two-part condensation curable silyl modified polymer-based sealant composition in accordance with claim 1, wherein Part A and Part B are inter-mixed in a weight ratio of from 15:1 to 1:1.

9. A method of making the two-part condensation curable silyl modified polymer-based sealant composition in accordance with claim 1, the method comprising mixing all of Part A and Part B together in a pre-defined weight ratio of from 15:1 to 1:1.

10. An elastomeric sealant material which is the cured product of the two-part condensation curable silyl modified polymer-based sealant composition in accordance with claim 1.

11. The elastomeric sealant material in accordance with claim 10, which is translucent.

12. A sealant suitable for use in the facade, insulated glass, window construction, automotive, solar and construction fields, wherein the sealant comprises or is formed from the two-part condensation curable silyl modified polymer-based sealant composition in accordance with claim 1.

13. A method for filling a space between two substrates so as to create a seal therebetween, the method comprising:

a) providing the two-part condensation curable silyl modified polymer-based sealant composition in accordance with claim 1, and either b) or c);

b) applying the silicone composition to a first substrate, and bringing a second substrate in contact with the sealant composition that has been applied to the first substrate, or c) filling a space formed by the arrangement of a first substrate and a second substrate with the sealant composition and curing the sealant composition.

14. The two-part condensation curable silyl modified polymer-based sealant composition in accordance with claim 6, wherein Part B comprises:

silyl modified organic polymer (ai) in an amount of from 50 to 97.9% by weight of Part B;

catalyst (e) in an amount of from 2 to 10% by weight of Part B;

adhesion promoter (f) in an amount of from 0.1 to 25% by weight of Part B;

cross-linker (g) in an amount of from 0 to 25% by weight of Part B; and moisture scavenger (h) in an amount of from 0 to 10% by weight of Part B;

wherein the total weight % of any Part B of the composition is 100%.

15. The two-part condensation curable silyl modified polymer-based sealant composition in accordance with claim 14, wherein Part A and Part B are inter-mixed in a weight ratio of from 15:1 to 1:1.

16. The two-part condensation curable silyl modified polymer-based sealant composition in accordance with claim 3, wherein the zinc carboxylate salt (ii) is zinc ethylhexanoate.

17. The two-part condensation curable silyl modified polymer-based sealant composition in accordance with claim 1, wherein the titanate (i) is tetra t-butyl titanate.

* * * * *